United States Patent
Bitar et al.

(10) Patent No.: US 9,258,529 B2
(45) Date of Patent: Feb. 9, 2016

(54) DATA DISTRIBUTION

(75) Inventors: Nabil N. Bitar, Acton, MA (US);
Michael P. Ruffini, Methuen, MA (US);
Rajesh Yadav, Ashland, MA (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 1200 days.

(21) Appl. No.: 12/579,570

(22) Filed: Oct. 15, 2009

(65) Prior Publication Data

US 2011/0093893 A1    Apr. 21, 2011

(51) Int. Cl.
*G06F 3/00* (2006.01)
*G06F 13/00* (2006.01)
*H04N 5/445* (2011.01)
*H04N 7/173* (2011.01)
*H04N 21/482* (2011.01)
*H04N 21/84* (2011.01)
*H04N 21/434* (2011.01)
*H04N 21/462* (2011.01)
*H04N 21/4722* (2011.01)
*H04N 21/6405* (2011.01)

(52) U.S. Cl.
CPC ....... *H04N 7/17318* (2013.01); *H04N 5/44543* (2013.01); *H04N 21/4345* (2013.01); *H04N 21/4349* (2013.01); *H04N 21/4622* (2013.01); *H04N 21/4722* (2013.01); *H04N 21/482* (2013.01); *H04N 21/4821* (2013.01); *H04N 21/6405* (2013.01); *H04N 21/84* (2013.01)

(58) Field of Classification Search
None
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |
| 5,790,198 A | 8/1998 | Roop et al. |
| 5,801,753 A * | 9/1998 | Eyer et al. ............. 725/50 |
| 5,801,787 A | 9/1998 | Schein et al. |

(Continued)

*Primary Examiner* — Jonathan V Lewis

(57) ABSTRACT

A device may include a communication interface configured to receive programming information from a service provider multicast over multiple channels. The device may also include logic configured to decode the programming information received over the multiple channels, assemble a programming guide based on the decoded programming information and output the programming guide to an output device for display.

15 Claims, 7 Drawing Sheets

(56) References Cited

U.S. PATENT DOCUMENTS

| | | |
|---|---|---|
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |
| 5,870,150 A | 2/1999 | Yuen |
| 5,886,746 A | 3/1999 | Yuen et al. |
| 5,915,026 A | 6/1999 | Mankovitz |
| 5,923,362 A | 7/1999 | Klosterman |
| 5,940,073 A | 8/1999 | Klosterman et al. |
| 5,946,045 A * | 8/1999 | Ozkan et al. ................... 725/54 |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,988,078 A | 11/1999 | Levine |
| 5,991,498 A | 11/1999 | Young |
| 6,002,394 A | 12/1999 | Schein et al. |
| 6,016,141 A | 1/2000 | Knudson et al. |
| 6,028,599 A | 2/2000 | Yuen et al. |
| 6,049,652 A | 4/2000 | Yuen et al. |
| 6,052,145 A | 4/2000 | Macrae et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 | 1/2001 | Alexander et al. |
| 6,216,265 B1 | 4/2001 | Roop et al. |
| 6,239,794 B1 | 5/2001 | Yuen et al. |
| 6,247,176 B1 | 6/2001 | Schein et al. |
| 6,262,722 B1 | 7/2001 | Allison et al. |
| 6,263,501 B1 | 7/2001 | Schein et al. |
| 6,281,940 B1 * | 8/2001 | Sciammarella ............... 348/564 |
| 6,323,911 B1 | 11/2001 | Schein et al. |
| 6,337,715 B1 * | 1/2002 | Inagaki et al. ................. 348/553 |
| 6,341,195 B1 | 1/2002 | Mankovitz et al. |
| 6,341,374 B2 | 1/2002 | Schein et al. |
| 6,349,115 B1 * | 2/2002 | Tahara et al. ............ 375/240.26 |
| 6,388,714 B1 | 5/2002 | Schein et al. |
| 6,396,546 B1 | 5/2002 | Alten et al. |
| 6,412,110 B1 | 6/2002 | Schein et al. |
| 6,430,358 B1 | 8/2002 | Yuen et al. |
| 6,430,359 B1 | 8/2002 | Yuen et al. |
| 6,453,471 B1 | 9/2002 | Klosterman |
| 6,460,181 B1 | 10/2002 | Donnelly |
| 6,466,734 B2 | 10/2002 | Yuen et al. |
| 6,469,753 B1 | 10/2002 | Klosterman et al. |
| 6,477,705 B1 | 11/2002 | Yuen et al. |
| 6,498,895 B2 | 12/2002 | Young et al. |
| 6,505,348 B1 | 1/2003 | Knowles et al. |
| 6,538,701 B1 | 3/2003 | Yuen |
| 6,549,719 B2 | 4/2003 | Mankovitz |
| 6,564,379 B1 | 5/2003 | Knudson et al. |
| 6,567,606 B2 | 5/2003 | Milnes et al. |
| 6,588,013 B1 | 7/2003 | Lumley et al. |
| 6,651,252 B1 * | 11/2003 | Gordon et al. ................. 725/54 |
| 6,658,661 B1 * | 12/2003 | Arsenault et al. ............... 725/54 |
| 6,668,133 B2 | 12/2003 | Yuen et al. |
| 6,687,906 B1 | 2/2004 | Yuen et al. |
| 6,732,369 B1 | 5/2004 | Schein et al. |
| 6,742,183 B1 | 5/2004 | Reynolds et al. |
| 6,745,391 B1 | 6/2004 | Macrae et al. |
| 6,756,997 B1 | 6/2004 | Ward et al. |
| 6,760,537 B2 | 7/2004 | Mankovitz |
| 6,799,326 B2 | 9/2004 | Boylan et al. |
| 6,799,327 B1 | 9/2004 | Reynolds et al. |
| 6,850,693 B2 | 2/2005 | Young et al. |
| 6,859,799 B1 | 2/2005 | Yuen |
| 6,859,839 B1 * | 2/2005 | Zahorjan et al. .............. 709/231 |
| 6,944,741 B1 * | 9/2005 | Kikinis et al. ................. 711/173 |
| 6,965,593 B2 | 11/2005 | Donahue et al. |
| 7,039,935 B2 | 5/2006 | Knudson et al. |
| 7,069,576 B1 | 6/2006 | Knudson et al. |
| 7,487,529 B1 | 2/2009 | Orlick |
| 7,519,982 B1 * | 4/2009 | Gordon ............... H04N 5/4401 |
| | | 725/102 |
| 7,558,870 B2 | 7/2009 | Parker |
| 7,565,153 B2 * | 7/2009 | Alcock et al. .............. 455/456.1 |
| 7,707,609 B2 | 4/2010 | O'Donnell et al. |
| 7,788,691 B2 | 8/2010 | Tsukamoto |
| 7,840,981 B2 | 11/2010 | Atwater et al. |
| 7,849,487 B1 * | 12/2010 | Vosseller ....................... 725/88 |
| 7,864,767 B2 | 1/2011 | Jang |
| 7,873,972 B2 * | 1/2011 | Zaslavsky et al. .............. 725/41 |
| 7,913,279 B2 * | 3/2011 | Simms et al. ................... 725/39 |
| 8,032,917 B2 * | 10/2011 | Poli et al. ...................... 725/140 |
| 8,104,062 B2 | 1/2012 | Terakado et al. |
| 8,223,625 B2 * | 7/2012 | Malladi et al. ................. 370/208 |
| 8,763,037 B2 * | 6/2014 | Hayes et al. ................... 725/39 |
| 8,774,062 B2 | 7/2014 | Bahnck et al. |
| 8,875,179 B2 | 10/2014 | Savard et al. |
| 9,021,538 B2 * | 4/2015 | Ellis .................. H04N 5/44543 |
| | | 725/93 |
| 2001/0029610 A1 | 10/2001 | Corvin et al. |
| 2001/0047298 A1 | 11/2001 | Moore et al. |
| 2001/0054181 A1 | 12/2001 | Corvin |
| 2002/0013949 A1 * | 1/2002 | Hejna, Jr. ..................... 725/100 |
| 2002/0073424 A1 | 6/2002 | Ward et al. |
| 2002/0124255 A1 | 9/2002 | Reichardt et al. |
| 2003/0005445 A1 | 1/2003 | Schein et al. |
| 2003/0014752 A1 * | 1/2003 | Zaslavsky et al. .............. 725/40 |
| 2003/0037331 A1 * | 2/2003 | Lee ................................ 725/32 |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0028206 A1 * | 2/2005 | Cameron et al. ................ 725/46 |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0251824 A1 | 11/2005 | Thomas et al. |
| 2006/0064721 A1 | 3/2006 | Del Val et al. |
| 2006/0156336 A1 | 7/2006 | Knudson et al. |
| 2006/0168632 A1 * | 7/2006 | Honda et al. .................... 725/95 |
| 2006/0174276 A1 * | 8/2006 | Derrenberger et al. .......... 725/46 |
| 2006/0212894 A1 | 9/2006 | Knudson et al. |
| 2006/0253867 A1 | 11/2006 | Potrebic et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0061840 A1 * | 3/2007 | Walter et al. .................... 725/39 |
| 2007/0107010 A1 | 5/2007 | Jolna et al. |
| 2007/0192812 A1 * | 8/2007 | Pickens et al. .................. 725/94 |
| 2007/0266414 A1 * | 11/2007 | Kahn et al. .................... 725/113 |
| 2008/0083000 A1 * | 4/2008 | Orrell et al. ..................... 725/53 |
| 2008/0127259 A1 | 5/2008 | Hong et al. |
| 2008/0155612 A1 | 6/2008 | Ikeda et al. |
| 2008/0253564 A1 * | 10/2008 | Kahn et al. .................... 380/200 |

(56) References Cited

U.S. PATENT DOCUMENTS

| | | |
|---|---|---|
| 2008/0271068 A1 | 10/2008 | Ou et al. |
| 2009/0007189 A1 | 1/2009 | Gutknecht et al. |
| 2009/0044242 A1 | 2/2009 | Ramakrishnan et al. |
| 2009/0106792 A1 | 4/2009 | Kan et al. |
| 2009/0144768 A1 | 6/2009 | Nagaraja |
| 2009/0150926 A1 | 6/2009 | Schlack |
| 2009/0163137 A1 | 6/2009 | Capparelli et al. |
| 2009/0165054 A1* | 6/2009 | Rudolph .................. 725/46 |
| 2009/0172720 A1 | 7/2009 | Kiiskinen et al. |
| 2009/0183206 A1 | 7/2009 | Lee et al. |
| 2009/0249398 A1 | 10/2009 | Cirrincione et al. |
| 2009/0328115 A1 | 12/2009 | Malik |
| 2010/0017824 A1* | 1/2010 | Malik ............................ 725/46 |
| 2010/0043034 A1 | 2/2010 | Li et al. |
| 2010/0050227 A1* | 2/2010 | Acharya et al. ............... 725/151 |
| 2010/0058405 A1 | 3/2010 | Ramakrishnan et al. |
| 2010/0111085 A1 | 5/2010 | Bauchot et al. |
| 2010/0316050 A1 | 12/2010 | Baykal et al. |
| 2010/0333143 A1* | 12/2010 | Civanlar et al. ................. 725/54 |
| 2011/0041148 A1 | 2/2011 | Piepenbrink et al. |
| 2011/0075663 A1 | 3/2011 | Serbest |

* cited by examiner

DATA DISTRIBUTION

BACKGROUND INFORMATION

Service providers, such as telecommunication service providers, often download common, non-private information to customers in a unicast manner. One drawback with distributing information in this manner is that the downloaded data consumes significant network bandwidth and other resources, such as firewall resources, load balancing resources, termination resources, etc. When the programming service provider has thousands of customers, the service provider is also forced to expend significant processing resources in providing the information of interest to the customers.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to downloading data to a number of receivers using a multicast transmission protocol, such as an Internet Protocol (IP) multicast. Use of IP multicast may allow for efficient utilization of network bandwidth resources, in addition for minimizing use of various processing resources. In one exemplary implementation, a set top box, a television card or cable card may receive programming guide data multicast over a number of channels. The service provider may encode the data such that the receiver is easily able to reassemble the programming guide and identify whether any information is missing. In some implementations, the receiver (e.g., set top box) may request missing information from the service provider via a unicast transmission. In other exemplary implementations, a set top box, a television card or a cable card may receive other common data elements, such as code modules or application data that is common to a number of end-user devices.

Figure 1:
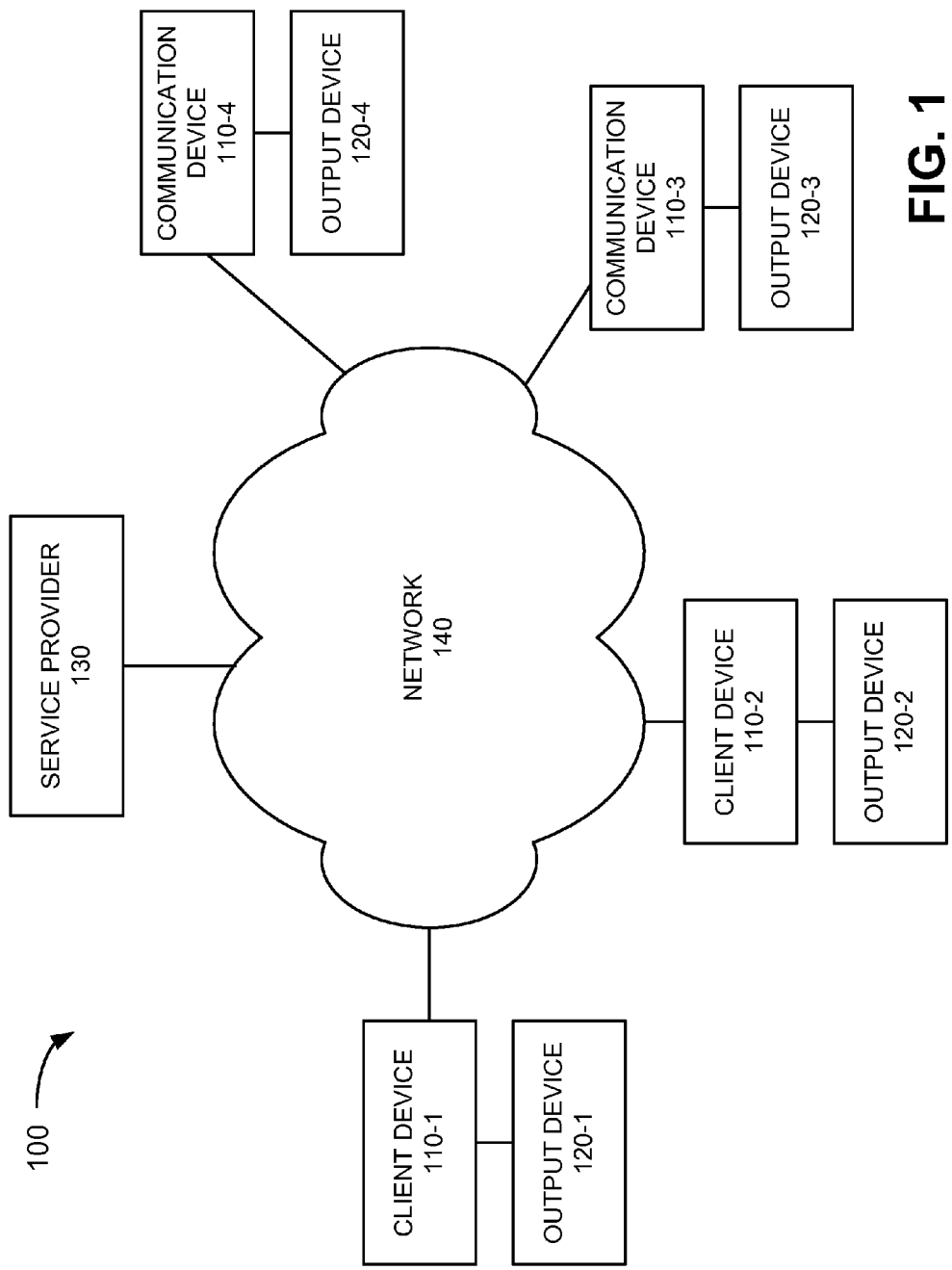
FIG. 1 illustrates an exemplary network in which systems and methods described herein may be implemented.

FIG. 1 is a block diagram of an exemplary network 100 in which systems and methods described herein may be implemented. Network 100 may include a number of client devices 110-1 through 110-4, referred to individually as client device 110 or client device 110-N (where N represents any integer value) and collectively as client devices 110. Network 100 may also include output devices 120-1 through 120-4, referred to individually as output device 120 or output device 120-N (where N represents any integer value) and collectively as output devices 120. Network 100 may further include service provider 130 and network 140.

Each of client devices 110 may include any type of device that is able to receive data, such as text data, video data, image data, audio data, multi-media data, etc., transmitted from a source, such as service provider 130. Each of client devices 110 may decode the data and output the data to an output device, such as output device 120, for viewing or playing. In an exemplary implementation, each of client devices 110 may include a set top box used to decode incoming multi-media data, such as multi-media data received from a television service provider, a cable service provider, a satellite system, a wireless system or some other wired, wireless or optical communication medium. The term "set top box" as used herein should be construed to include any device used to receive signals from an external source and output the signals for viewing or playing. In some implementations, one or more of client devices 110 may forward the decoded data for viewing or playing by another device, such as output device 120. In other implementations, one or more of client devices 110 may play and display the decoded media.

For example, in some implementations, one or more of client devices 110 may include some type of computer, such as a personal computer (PC), laptop computer, home theater PC (HTPC), etc., that is able to receive incoming data and decode the incoming data for output to a display, which may be included with client device 110. In this instance, a client device 110 may include logic, such as a cable card, television card or other logic, to interface with service provider 130.

Each of output devices 120 may include any device that is able to output/display various media, such as a television, monitor, PC, laptop computer, HTPC, a personal digital assistant (PDA), a web-based appliance, a mobile terminal (e.g., a cellular telephone), etc. In an exemplary implementation, output device 120 may receive multi-media data from client device 110 and display or play the media.

Service provider 130 may include one or more computing devices, servers and/or backend systems that are able to connect to network 140 and transmit and/or receive information via network 140. In an exemplary implementation, service provider 130 may provide multi-media information, such as television programming, movies, sporting events, podcasts or other media presentations to communication device 110 for output to a user/viewer. Service provider 130 may also multicast various data, such as program guide data associated with television programming, to client devices 110, as described in detail below.

Network 140 may include one or more wired, wireless and/or optical networks that are capable of receiving and transmitting data, voice and/or video signals, including multi-media signals that include voice, data and video information. For example, network 140 may include one or more public switched telephone networks (PSTNs) or other type of switched network. Network 140 may also include one or more wireless networks and may include a number of transmission towers for receiving wireless signals and forwarding the wireless signals toward the intended destinations. Network 140 may further include one or more satellite networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, four client devices 110 and four output devices 120 are shown for simplicity. It should be understood that network 100 may include hundreds or thousands of client devices 110 and output devices 120. Network 100 may also include additional elements, such as switches, gateways, routers, backend systems, etc., that aid in routing information, such as media streams from service provider 130 to client device 110. In addition, although client device 110 and output device 120 are shown as separate devices in FIG. 1, in other implementations, the functions performed by two or more of these devices may be performed by a single device or platform.

Figure 2:
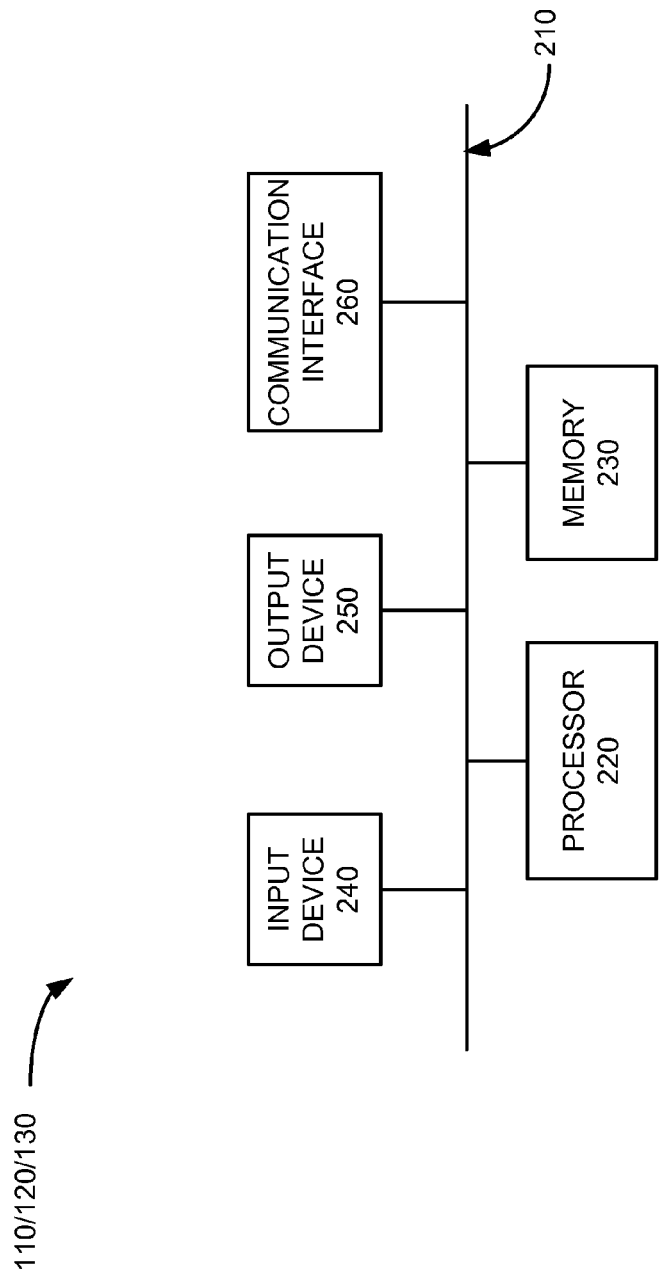
FIG. 2 illustrates an exemplary configuration of the client device, output device or service provider of FIG. 1.

FIG. 2 illustrates an exemplary configuration of client device 110. Output device 120 and service provider 130 may be configured in a similar manner. Referring to FIG. 2, client device 110 may include a bus 210, a processor 220, a memory 230, an input device 240, an output device 250 and a communication interface 260. Bus 210 may include a path that permits communication among the elements of client device 110.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive. In an exemplary implementation, memory 230 may store programming received from service provider 130, as described in detail below.

Input device 240 may include a mechanism that permits a user to input information to client device 110, such as a keyboard, a keypad, a mouse, a pen, a microphone, a touch screen, voice recognition and/or biometric mechanisms, etc. Input device 240 may also include mechanisms for receiving input via a remote control device which sends commands to client device 110 via IR or radio frequency signals. Output device 250 may include a mechanism that outputs information to the user, including a display, a printer, a speaker, etc.

Communication interface 260 may include any transceiver-like mechanism that client device 110 may use to communicate with other devices (e.g., output device 120) and/or service provider 130. For example, communication interface 260 may include mechanisms for communicating with output device 120 and service provider 130 via wired, wireless or optical mechanisms. For example, communication interface 260 may output received television programming data to output device 120. Communication interface 260 may also include one or more radio frequency (RF) transmitters, receivers and/or transceivers and one or more antennas for transmitting and receiving RF data via network 140. Communication interface 260 may also include a modem or an Ethernet interface to a LAN or other mechanisms for communicating via a network, such as network 140 or another network via which client device 110 communicates with other devices/systems.

The exemplary configuration illustrated in FIG. 2 is provided for simplicity. It should be understood that client device 110, output device 120 and service provider 130 may include more or fewer devices than illustrated in FIG. 2. For example, various modulating, demodulating, coding and/or decoding components, one or more power supplies or other components may be included in one or more of client device 110, output device 120 and service provider 130.

Client device 110, output device 120 and/or service provider 130 may perform operations in response to their respective processors 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
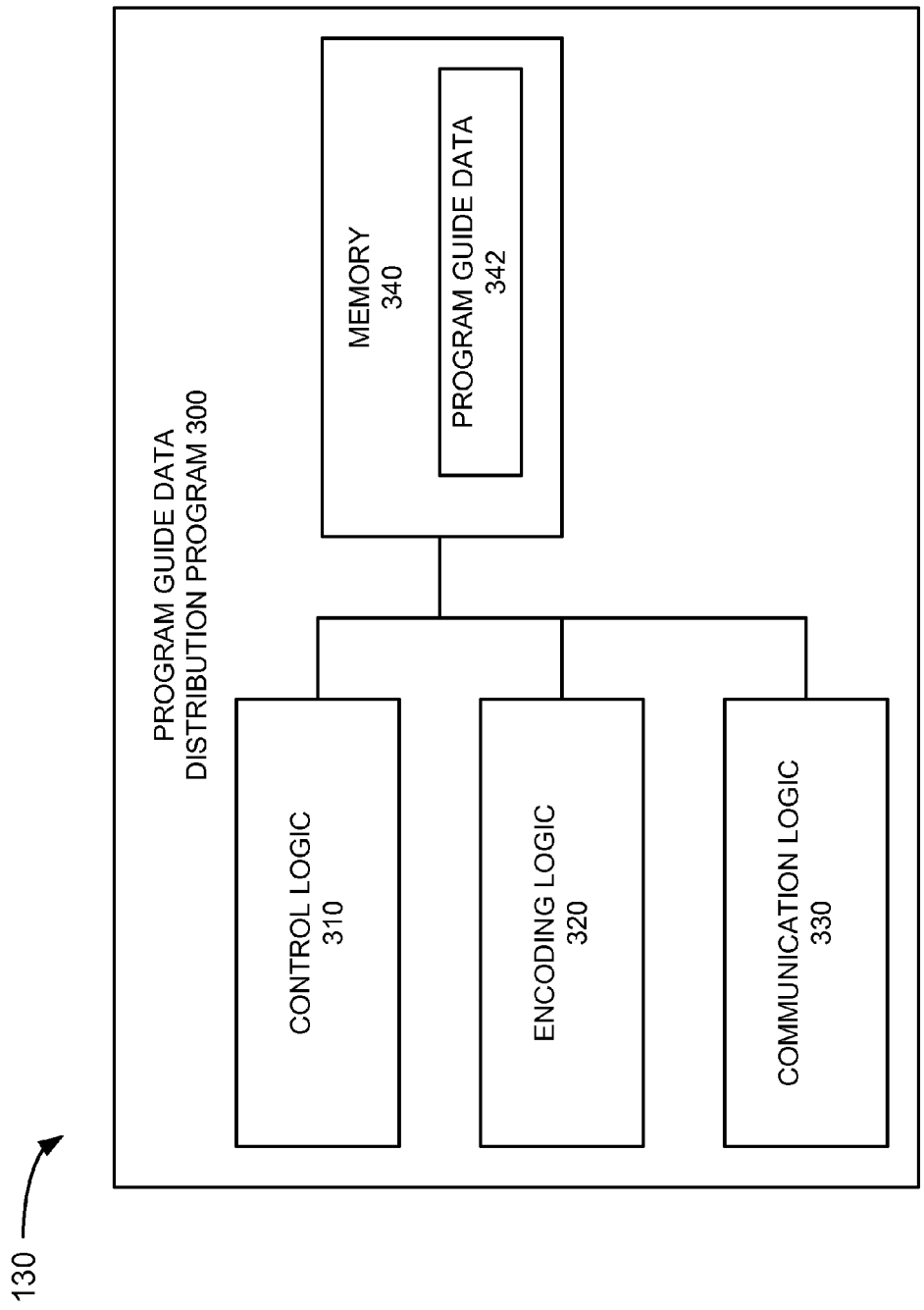
FIG. 3 illustrates an exemplary configuration of logic components implemented in the service provider of FIG. 1.

FIG. 3 is an exemplary functional block diagram of components implemented in service provider 130 of FIG. 2. In an exemplary implementation, all or some of the components illustrated in FIG. 3 may be stored in memory 230. For example, referring to FIG. 3, memory 230 of service provider 130 may include program guide data (PGD) distribution program 300.

PGD distribution program 300 may include a software program executed by processor 220 that allows service provider 130 to multicast television programming guide information to client devices 110. In an exemplary implementation, PGD distribution program 300 may include control logic 310, encoding logic 320, communication logic 330 and memory 340.

Control logic 310 may include logic for controlling the operation of PGD distribution program 300. For example, control logic 310 may control the multicasting of program guide data that will be displayed to users via client devices 110 and/or output devices 120.

Encoding logic 320 may include logic to encode data, such as program guide data, to enable reliable delivery of the data to client devices 110. For example, in one implementation, encoding logic 320 may encode the program guide data into data blocks that enable the transmission of the data over IP multicast.

Communication logic 330 may include logic for transmitting data via one or more multicast communication channels. For example, in one implementation, communication logic 330 may use multiple channels to transmit program guide data to client devices 110.

Memory 340 may include one or more memories for storing data to be broadcast to client devices 110. For example, memory 340 may include program guide data 342 that includes television programming guide information for display by client devices 110 and/or output devices 120.

PGD distribution program 300 may multicast programming information and other information that enables client devices 110 to assemble a program guide, detect missing information and detect corrupted data, as described in detail below. More particularly, encoding logic 320 may use a data block encoding scheme that enable client devices 110 to detect lost blocks, and re-sequence blocks received out of order. PGD distribution program 300 also enables client devices 110 to interact with service provider 130 to ensure that the client devices 110 have the required information, as described in detail below.

Figure 4:
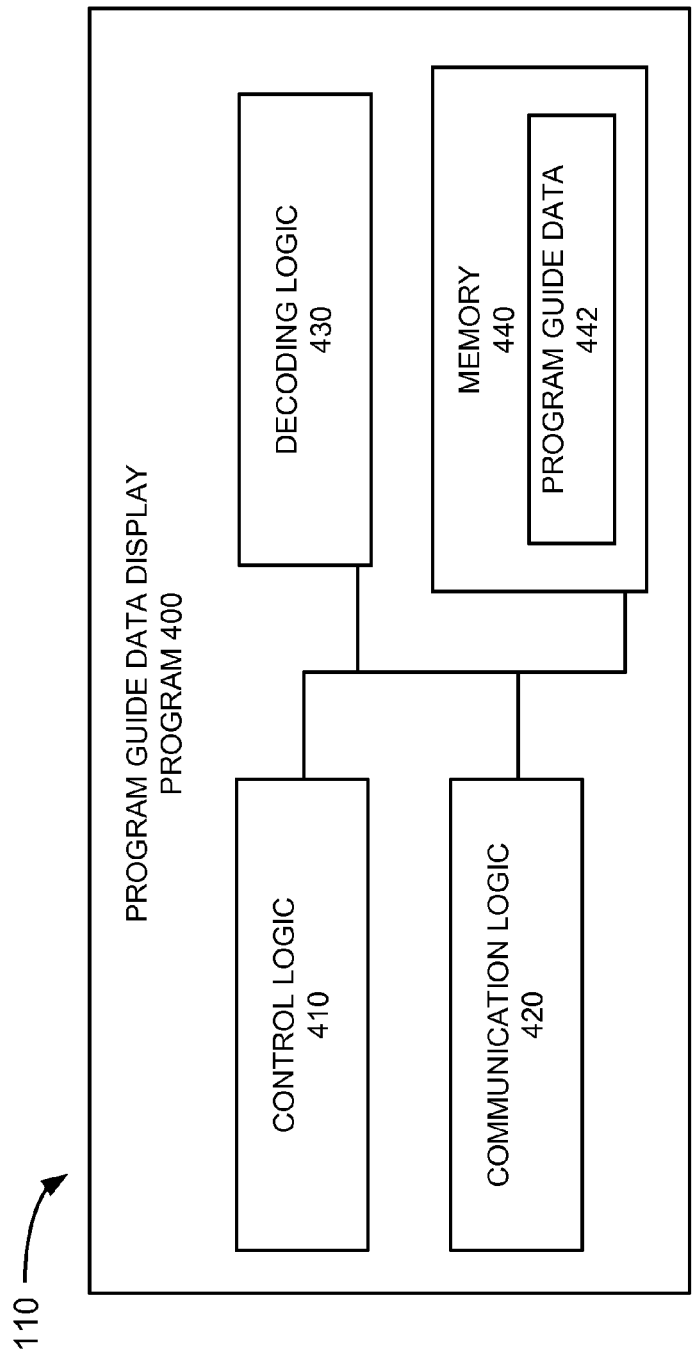
FIG. 4 illustrates an exemplary configuration of logic components implemented in the client device of FIG. 1.

FIG. 4 is an exemplary functional block diagram of components implemented in client device 110 of FIG. 2. In an exemplary implementation, all or some of the components illustrated in FIG. 4 may be stored in memory 230. For example, referring to FIG. 4, memory 230 of client 110 may include PGD display program 400.

PGD display program 400 may include a software program executed by processor 220 that allows client 110 to receive and display television programming guide information. In an exemplary implementation, PGD display program 400 may include control logic 410, communication logic 420, decoding logic 430 and memory 440.

Control logic 410 may include logic for controlling the operation of client device 110. For example, control logic 410 may control the reception and display of program guide data that will be output to users via, for example, output device 120.

Communication logic 420 may include logic for receiving data via one or more multicast communication channels. For example, in one implementation, communication logic 420 may receive PGD transmitted by service provider 130 over multiple channels. In addition, communication logic 420 may include logic for transmitting requests to service provider 130, such as requests for missing portions of PGD. The service provider system handling these requests from client devices 110 and the one multicasting the PGD data to client devices 110 may be the same system (e.g., service provider 130) or different systems (e.g., multiple systems associated with service provider 130).

Decoding logic 430 may include logic to decode data, such as program guide data, to enable the received data to be displayed. For example, in one implementation, decoding logic 430 may decode the program guide data for display by output device 120.

Memory 440 may include one or more memories for storing data transmitted from service provider 130. For example, memory 440 may include program guide data 442 that stores television programming guide information for display by client device 110 and/or output device 120. In an exemplary implementation, PGD display program 400 may interact with service provider 130 to display television programming information, as described in detail below.

In an exemplary implementation, client device 110 and/or PGD display program 400 may be a domain name system (DNS) client that supports Internet Group Management Protocol version 3 (IGMPv3) with source specific multicast (SSM) joins/reports/leaves or IGMPv2. In either case, PGD display program 400 and/or client 110 may be a DNS client that is able to resolve a server identified by a DNS name, such as a server associated with service provider 130, to an IP address.

As discussed above, PGD display program 400 may support IGMPv3 for SSM or IGMPv2. In addition, PGD display program 400 may support the configuration of multicast channels on which program guide data will be transmitted, enable the configuration of an association between a multicast channel and a program guide data file ID and support the provisioning of service provider 130's address as an IP address and/or DNS name. PGD display program 400 may further support the provisioning of the service provider 130's IP address/DNS name as the source for a multicast channel or group, as described in more detail below.

Figure 5:
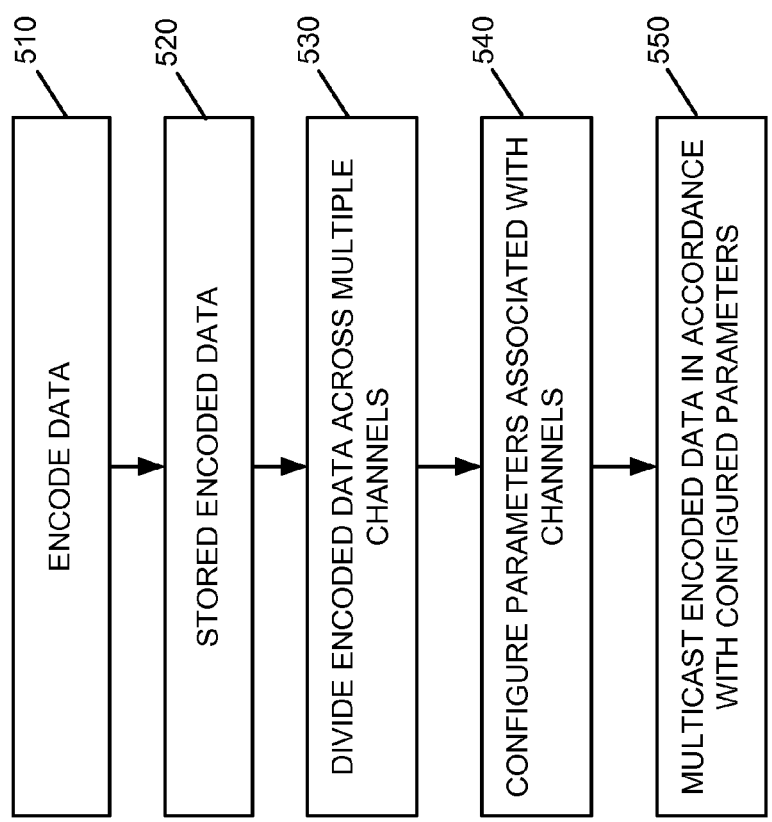
FIG. 5 is a flow diagram illustrating exemplary processing by the service provider of FIG. 3.

FIG. 5 is a flow diagram illustrating exemplary processing associated with service provider 130. In this example, assume that service provider 130 executes PGD distribution program 300 to provide program guide data to client devices 110 for display to users via output devices 120. Processing may begin with service provider 130 encoding the program guide data for transmission to client devices 110 (act 510). In an exemplary implementation, encoding logic 320 (FIG. 3) may encode the PGD in accordance with user datagram protocol/Internet protocol (UDP/IP). For example, in one implementation, the PGD may be carried in a UDP/IP packet and may include a block header followed by the application data (i.e., the PGD), as illustrated in FIG. 6.

Figure 6:
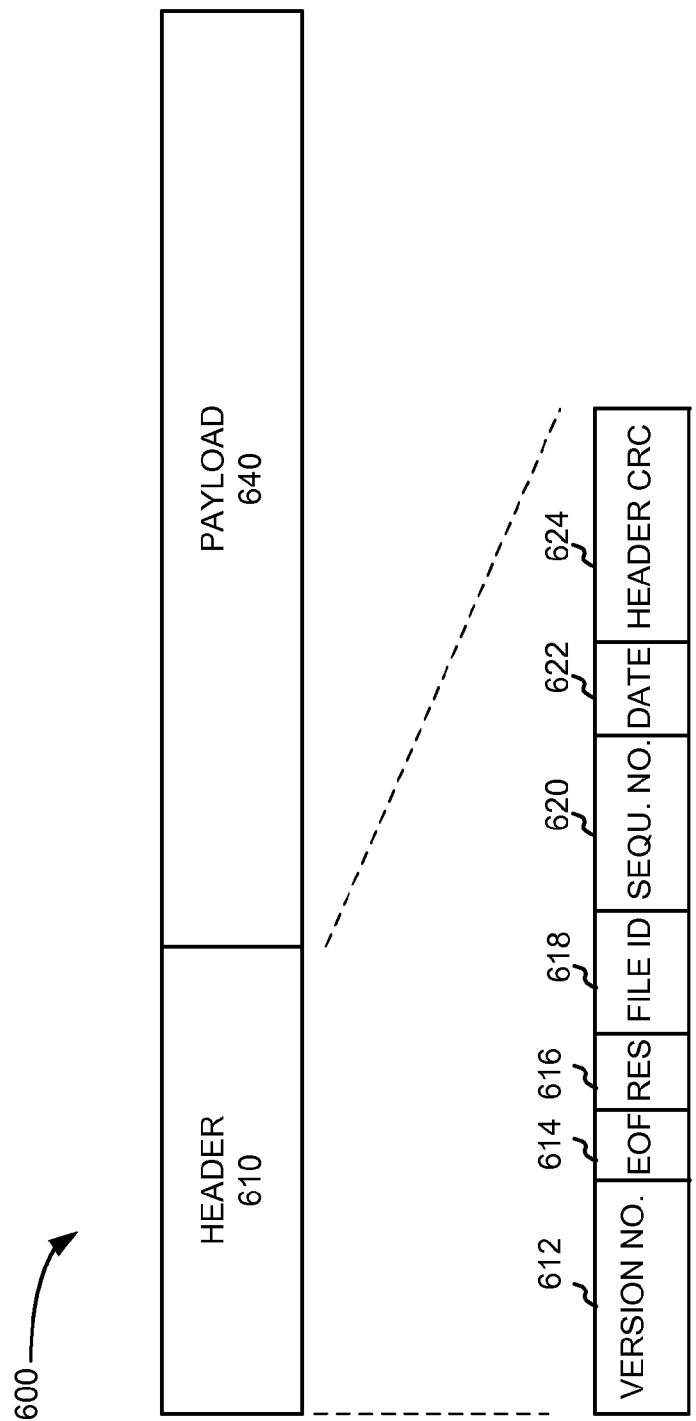
FIG. 6 illustrates an exemplary data block consistent with aspects of the invention.

Referring to FIG. 6, PGD data block 600 may include header 610 and payload 640. Payload 640 may correspond to the actual PGD that will be displayed to users at client devices 110/output devices 120. In an exemplary implementation, the first byte of header 610 may include a version number field 612. The version number field 612 may be four bits in length and may define the block encoding used. In an exemplary implementation, the first version number may be 0×0. The fifth bit of header 610 may be an end of file (EOF) marker indication field 614. EOF field 614 may be set to one if the current block is the last block in the file and to zero otherwise. Bits 6, 7 and 8 of header 610 may be a reserved field 616, which may be set to zero in version 0×0.

Field 618 of header 610 may include a 1-byte file/object identifier. For example, each PGD file/object may be assigned an identifier with an integer value between 0 and 255 that is stored in field 618. The value in field 618 may be used by client device 110 to identify the particular file or object being multicast. For example, the PGD may be broken up into several files and each file may be composed of several blocks. The file/object identifier may be used by client devices 110 to identify the particular block as part of a file object being transmitted. Field 620 of header 610 may include a 2-byte sequence number that identifies the position of the data block in the file for enabling re-ordering, detecting missing blocks/data, etc. For example, in some instances, a file may be too large for a single block 600. In such instances, the sequence number in field 620 identifies the particular order of the blocks in the file. In an exemplary implementation, the first block of the file may be set to a value of zero and subsequent blocks may be incremented with values of 1, 2, etc.

Field 622 of header 610 may include a 2 byte date of issue of file/object. Field 622 may be used to help set/reset assembly of the PGD at client devices 110 based on file/object date. For example, when the date received in a block associated with a file exceeds the date of the current assembly session, the current assembly session is abandoned and a new assembly session starts. This situation may occur in a transition time between transmission of an old file and transmission of a new file when the older file did not finish assembly at a particular client device 110. In an exemplary implementation, one byte of field 622 will represent the day of month (i.e., 1-31) and the other byte may represent the month (i.e., 1-12). The transition between 1 (day)/12 (month) and 1 (day)/1(month) is treated such that 1/1 is considered more recent than 1/12. That is, January 1 is treated as being more recent than December 1.

Field 624 of header 610 may include a 2-byte header cyclic redundancy check (CRC) value. The 2-byte CRC value in field 624 is computed on the header 610. The CRC value may be used by client devices 110 to detect errors in the transmitted data, as described in more detail below.

The first data block in payload 640 (i.e., block with sequence number 0) may contain the file/object size identifying the number of blocks in payload 640. In an exemplary implementation, this block may be a 2-byte field. In addition, each payload 640 may contain in the last 4 bytes, a 4-byte-CRC computed on the block content, including the header. That is, the last four bytes of payload 640 may include a CRC value computed based on the entire contents of data block 600.

In an exemplary implementation, each data block (e.g., data block 600) fits in a network maximum transferrable unit (MTU). In one implementation, the size of data block 600, including header and payload, may be configurable with a default value set at, for example, 1500 bytes. It should be understood that other block sizes may be used. In some instances, reducing the block size and transmitting smaller blocks over multiple channels may reduce the duration needed for client devices 110 to reconstruct the complete PGD file. In addition, if a data block 600 is split across MTUs, various issues may need to be addressed by client devices 110. For example, if a packet that contains partial content of a block is lost, a receiving client device 110 may need to wait for the block to be retransmitted in a subsequent interval before completing the reconstruction of the television PGD file.

As discussed above, service provider 130 may multicast (e.g., IP multicast) PGD to client devices 110. In an exemplary implementation, service provider 130 may support the association of a PGD file/object with a multicast channel and the association of multiple files/objects with the same channel. Client devices 110 may then construct each PGD file/object or group of files/objects sent on a multicast channel as a collection of clearly identified data blocks, as described in more detail below.

Referring back to FIG. 5, after the PGD is encoded, control logic 310 may store the encoded PGD in memory 340 (act 520). For example, control logic 310 may store the encoded data in program guide data 342. In an exemplary implementation, service provider 130 may send multiple files/objects on the same or different multicast channel asynchronously and enable client devices 110 to construct each of these files from potentially interleaved (e.g., interleaved across files) blocks.

For example, as described previously, PGD distribution program 300 may send each PGD data block in an IP/UDP packet. In an exemplary implementation, service provider 130 may support source specific mode (SSM) IP multicast by enabling the assignment of an IP multicast group address from the 232/8 space (i.e., 232.0.0.0 to 232.255.255.255) to each multicast channel used to distribute PGD. For example, in one implementation, service provider 130 may support N multicast channels (one per multicast group, where N is any integer value). The number of channels needed may depend on how the object files are split across channels. For example, the more the PGD is divided across channels, the less the likelihood that a client device 110 will receive duplicate data when data loss occurs.

In an exemplary implementation, service provider 130 may divide PGD data across N multicast channels (act 530). For example, in one implementation, service provider 130 may divide the PGD into four multicast channels. In this implementation, multicast channel 1 may be used to send the configuration file, language file, channel map, channel lookup table, and the first day of programming guide data. For example, once a client 110 joins the multicast channel, it will receive one day worth of guide data in addition to various configuration, language, channel map and channel lookup information needed to display the program guide. Multicast channel 2 may be used to send the next 2-7 days worth of programming guide data. For example, once a client 110 joins the multicast channel, it will receive 2-7 days worth of guide data. Multicast channel 3 may be used to send the next 8-14 days worth of programming guide data. Similar to days 2-7, once a client 110 joins the multicast channel, it will receive days 8-14 of programming guide data. Multicast channel 4 may be used to send channel logos and bitmaps at, for example, a slower encoding rate. In this manner, service provider 130 divides the programming guide data into chunks that allow for efficient transmission to client devices 110.

Service provider 130 may also be able to accept unicast TCP connections requesting PGD downloads simultaneously with IP multicast transmission. Allowing client devices 110 to request PGD via unicasting provides for emergency downloading of PGD and may also support for legacy deployment scenarios in which client devices 110 (e.g., set top boxes) may be configured to generate unicast requests and receive unicast transmission of PGD. In some implementations, the multicast system and unicast systems used to transmit data to client devices 110 may be different systems. In addition, accepting TCP connection requests may also allow service provider 130 to balance its load based on the particular request.

In an exemplary implementation, service provider 130 may configure various parameters associated with each channel (act 540). For example, a party associated with service provider 130 may configure PGD distribution program 300 to periodically transmit the data with the following configurable parameters per channel: 1) time period for transmission per channel in hours (this may include 24 hours a day, potentially excluding a maintenance window that may be used for updating the program guide; 2) waiting time between re-transmissions per channel in, for example, seconds (in some implementations, service provider 130 may set different periods based on time of day); and 3) transmission rate in kilobits per second (kbps), such as 100 kbps per channel (in some implementations, service provider 130 may configure the channels to transmit at different rates based on, for example, the time of day or the particular channel/information being transmitted).

For example, service provider 130 may configure a "carousel interval" in which control logic 310 periodically sends the PGD data. As one example, control logic 310 may transmit the PGD over each of multicast channels 1-4 every two minutes, with the data being transmitted on channels 1-4 being separated by a very short duration (e.g., 1 second, 10 seconds, 30 seconds or some other configurable duration). In this scenario, during the first carousel interval, control logic 310 may transmit data that may comprise the entire program guide associated with two weeks of television programming. During a subsequent carousel interval two minutes later, control logic 310 may repeat the process. Therefore, every two minutes, the entire PGD file is transmitted to client devices 110. In this manner, under ideal conditions, client devices 110 may be able to reconstruct the PGD file in as little as one carousel interval from the time that the client device 110 joined a multicast channel.

Service provider 130 may then multicast the encoded data on the channels (act 550). For example, communication logic 330 may transmit the PGD in accordance with the configured parameters. In this manner, service provider 130 may distribute PGD data using multicast transmissions, as opposed to unicast transmissions. This helps save considerable resources at service provider 130, as well as saving bandwidth. Client devices 110 may then receive and display PGD, as described in detail below.

Figure 7:
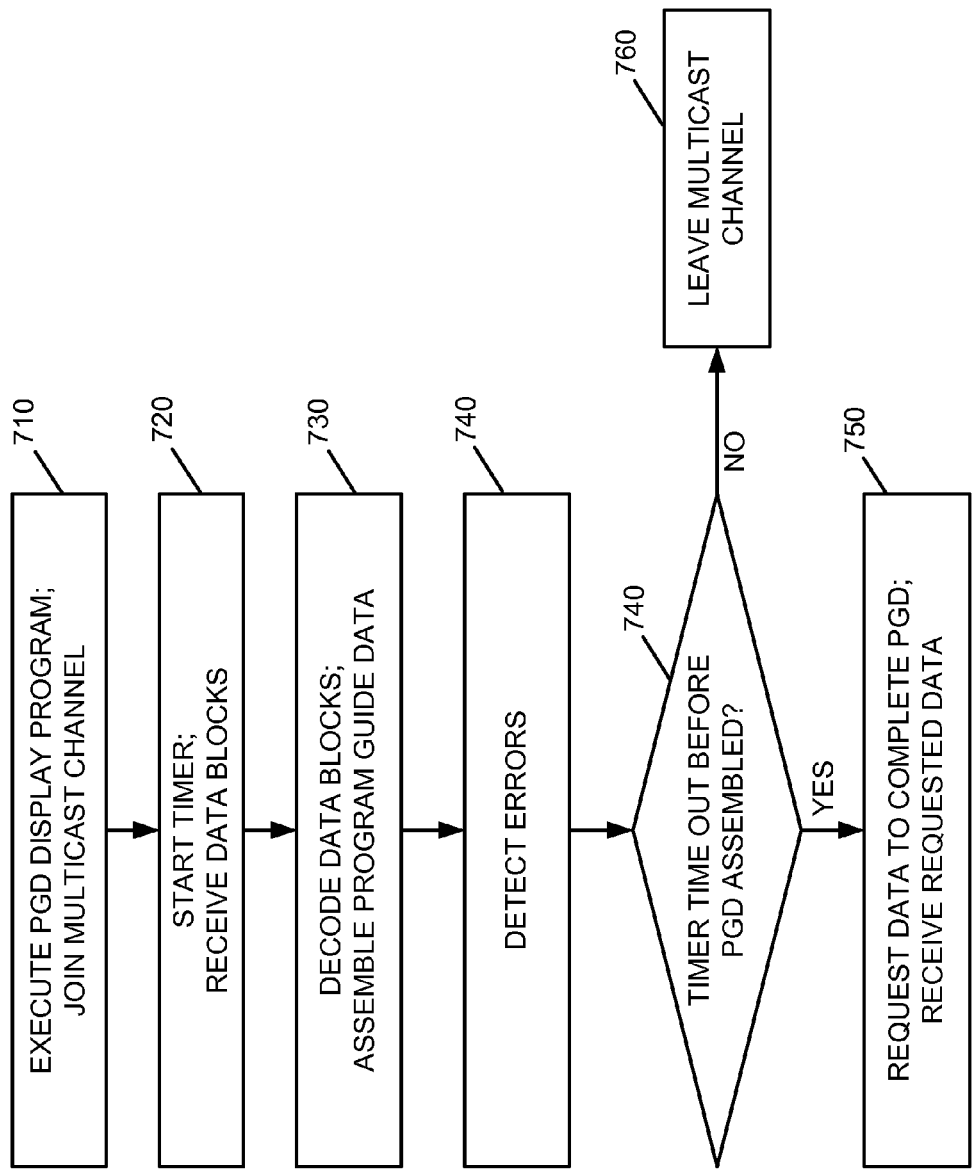
FIG. 7 is a flow diagram illustrating exemplary processing associated with the client device of FIG. 4.

FIG. 7 illustrates exemplary processing associated with client devices 110. Assume that a client device, such as client device 110-1, powers up and executes PGD display program 400 (act 710). Client 110-1 may need PGD after it is newly installed, after it is reset/rebooted, and on a daily basis under normal operation conditions to enable users to be able to view corresponding television guide information. In an exemplary implementation, client 110-1 may support IGMPv3 with source specific multicast (SSM) joins (reports)/leaves or IGMPv2. In either case, client 110-1 may attempt to receive PGD from service provider 130 by joining one or more associated multicast channels.

For example, communication logic 420 may attempt to join a multicast channel associated with service provider 130 by sending a join request or report to service provider 130. If communication logic 420 receives a first multicast packet on a particular channel after sending a join request/report, this is an indication of a successful join. Communication logic 420 may be persistent in joining the multicast channel until it is successful. For example, communication logic 420 may attempt to join a multicast group/channel via multiple trials, e.g., sending multiple reports (joins) until the join is successful.

Assume that client 110-1 has successfully joined a multicast channel associated with service provider 130 which multicasts PGD data on channels 1-4 (act 710). After client device 110-1 has successfully joined a multicast channel, client device 110-1 may start a timer (act 720). For example, control logic 410 may start a timer to ensure that the complete PGD data file may be assembled within a predetermined time or a predetermined number of carousel intervals.

Assume that client device 110-1 starts receiving the multicast transmissions from service provider 130 (act 720). For example, client device 110-1 may receive the data blocks multicast over channels 1-4. As discussed above, service provider 130 may transmit the data on channels 1-4 simultaneously or in close time proximity to one another.

Decoding logic 430 may decode the data blocks transmitted on each of the channels (act 730). For example, decoding logic 430 may decode the data transmitted on channel 1. Simultaneously, or nearly simultaneously with decoding the information transmitted on channel 1, decoding logic 430 may decode the data transmitted on channels 2, 3 and 4 (act 730). Control logic 410 may then construct the file object from the corresponding data blocks to form the program guide file (act 730).

In situations where client device 110-1 joined a multicast channel in the middle of a carousel interval for that channel, control logic 410 may need to assemble the object over two carousel intervals. That is, client device 110-1 may receive only a portion of the data transmitted over the first interval of time and may have to wait until the data is retransmitted during the subsequent interval to receive the remaining portion of the data block.

In other instances, due to potential packet loss, client device 110-1 may need to assemble an object file over two or more carousel intervals. As discussed above, the data blocks may be encoded such that they identify the file object they belong to, and are assigned sequence numbers so that a data block loss can be detected enabling a client to assemble blocks in order to maintain file coherency.

Control logic 410 may also identify erroneous blocks based on block header CRC check and block CRC check (act 740). For example, control logic 410 may use header CRC field 624 to identify an error in header 610. Control logic 410 may also detect an error in block 600 using the overall block CRC included in data block 600. Control logic 410 may further detect duplicate blocks and discard any duplicate of a data block that has already been received.

Control logic 410 may then re-order correctly received data blocks that belong to the same data file and arrive out of order at client device 110. That is, control logic 410 may re-construct the program guide data file from the correctly received blocks. For example, control logic 410 may use file ID field 618, sequence number field 620 and data field 622 to ensure proper reconstruction of the PGD file and preserve the date/version of the program guide so that the most current guide data is provided (e.g., old guide data is not provided).

As discussed above, in some instances, a client device, such as client device 110-1 may not be able to assemble an object file across multiple transmissions. Therefore, as also discussed above, client device 110-1 may set a timer when it successfully joins a multicast channel. In such instances, client device 110 may also set a time threshold for a given object file that may correspond to multiple carousel intervals (e.g., three carousel intervals, which may correspond to six minutes). If this threshold is reached (act 740—yes), client device 110-1 may exit the multicast channel. Client device 110-1 may also send a request for data directly to service provider 130 via a unicast session between client device 110 and service provider 130. That is, client device 110-1 may request that service provider 130 transmit the object file it needs to reassemble the program guide data file (act 750). In an exemplary implementation, client device 110-1 may specifically request only the missing data blocks from service provider 130. That is, using sequence number information, control logic 410 may identify the particular missing data block(s). Requesting only the missing portion of a data file may further optimize the construction of the complete program guide data.

In other implementations, if client device 110-1 is not able to completely receive an object file or has not received a data block/packet on that channel for a configurable time, client 110-1 may reissue a join/report for that multicast channel. However, after a configurable period of time, client 110-1 may request a TCP-based unicast download of a data file if PGD file compilation could not be completed via IP multicast after a configurable time period, such as a period of time since client device 110-1 started compilation of the PGD file or a period of time since client 110-1 attempted to join the multicast channel.

In each case, when a TCP-based download of a file starts, client device 110-1 may exit or leave the associated multicast channel and start a download for each file associated with that channel and that was not successfully received As also discussed above, client device 110-1 may request download of only missed blocks rather than initiate a full download of the entire PGD file.

Referring back to FIG. 7, when client device 110-1 has correctly received all data blocks within the predetermined time (act 740—no), client device 110-1 may leave the multicast channel (act 760). In this manner, client device 110-1 may conserve processing resources and attempt to rejoin a multicast channel to receive updated PGD at its configured time.

In some implementations, client device 110-1 may be connected to a LAN with other client devices 110. For example, client device 110-1 may be a set top box located in a home or an apartment that includes multiple client devices 110. In such instances, control logic 410 of client device 110-1 may snoop on IGMP reports or queries on the same LAN to determine whether client devices 110 located on the same LAN are joining or querying service provider 130 for PGD data. In other implementations, a client 110 attempting to join a multicast channel may send an alert message to each client 110 located on that LAN indicating that a join request is in progress. In either case, notifying other client devices 110 of a join request may be useful in situations where a number of client devices 110 are located in the same home and may result in more efficient utilization of network resources.

For example, in some implementations, each client device 110-1 located in a home may be configurable with respect to the time of day during which it attempts to update its program guide data (i.e., when it should join associated multicast channels). However, in some implementations, if one client device 110 located on the LAN wakes up and initiates a join to a multicast channel from service provider 130, all other client devices 110 on that LAN may identify that request and wake up and request similar joins to the multicast channel. In this manner, each of the client devices 110 located on a LAN (e.g., located in a single home or apartment) may join a multicast channel at the same time, as opposed to each client device 110 located on the LAN sending join requests at different times. This may result in all of the client devices 110 in a home being synchronized with respect to receiving the PGD and may make more efficient use of bandwidth between the home and service provider 130.

In still other implementations, once a single client device 110 (e.g., client device 110-1) receives the complete PGD file from service provider 130, that client device 110-1 may provide the PGD data file to other client devices 110 located on the LAN (e.g., in the home). This may save additional resources associated with contacting service provider 130 for the PGD file.

Implementations described herein provide for reliable multicasting of information to a number of receiver devices. This may allow for efficient utilization of network bandwidth resources, in addition to minimizing use of various processing resources. In exemplary implementations, a service provider may encode the data in a manner that allows the receiver device to easily reassemble the data and/or request missing information. This may result in more efficient processing at the receiver.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, a client device 110 requests to join a multicast channel. In other implementations, a client device 110 may submit requests to join particular channels. In other implementations, a client device 110 may submit requests to join particular channels. In addition, in some instances, client device 110 may be configured with the sequence of channels that it will attempt to join upon power up/waking up. For example, a first join request may be transmitted to service provider 130 to join the multicast channel carrying configuration, languages, channel-map and the first day of programming information (e.g., channel 1). In this manner, client device 110 will be able to display at least one day of programming very quickly after powering up. Client device 110, however, may delay joining the other channels (e.g., channels 2-4) for a configurable time so that client device 110-1 is not overloaded upon power up.

In addition, features have been described above with respect to multicasting program guide information from service provider 130 to client devices 110. In other implementations, other types of information may be encoded (e.g., code modules, application data, etc.), as described above, for multicast transmission to receiver devices. In each case, the encoding scheme may allow the receiver devices to easily reassemble the multicasted data and/or request missing data via unicast transmissions.

Still further, features described above may be used with any type of television system, such as any digital television system (e.g, a digital quadrature amplitude modulated (QAM) system, an Internet protocol television system (IPTV) system associated with a multi-media network, etc,), an analog system or any other television system.

In addition, while series of acts have been described with respect to FIGS. 5 and 7, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A device, comprising:
   a communication interface configured to receive programming information from a service provider multicast over a plurality of channels, wherein the plurality of channels comprises four channels; and
   logic configured to:
   decode the programming information received over the plurality of channels,
   assemble a programming guide based on the decoded programming information, and
   output the programming guide to an output device for display,
   wherein when assembling the programming guide, the logic is further configured to:
   identify sequence number information associated with the decoded programming information, and
   assemble the programming guide using the sequence number information, and
   wherein at least two of the channels are used to multicast programming schedule information and at least one of the channels is used to multicast channel logo information.

2. The device of claim 1, wherein the logic is further configured to:
   transmit, via the communication interface, a request to the service provider to join a multicast channel, and
   determine whether the programming guide is complete before a predetermined time threshold is reached.

3. The device of claim 2, wherein the logic is further configured to:
   request, from the service provider, at least a portion of the programming guide when the programming guide is not complete before the predetermined time threshold is reached.

4. The device of claim 1, wherein when assembling the programming guide, the logic is configured to assemble programming information multicast over a plurality of transmission intervals.

5. The device of claim 1, wherein the logic is further configured to:

perform error detection on the decoded programming information to detect erroneous data blocks, and identify missing blocks based on the sequence number information associated with the decoded programming information.

6. The device of claim 1, wherein the logic is further configured to:

receive an indication that another device located on a same local area network has attempted to join a multicast channel associated with the service provider, and attempt to join the multicast channel in response to the indication.

7. The device of claim 1, wherein the device comprises at least one of a set top box or a device including a cable or television card configured to receive television programming.

8. A method, comprising:

encoding television programming guide data for multicast transmission to a plurality of receiver devices;

dividing the encoded television programming guide data for transmission over multiple channels;

multicasting the encoded television programming guide data over the multiple channels;

retransmitting the multicasting at predetermined intervals;

receiving a request from a first one of the plurality of receiver devices for information associated with television programming guide data that is needed by the first receiver device to assemble a complete television programming guide;

unicasting the information to the first receiver device, wherein the encoding television programming guide data comprises:

encoding programming schedule information comprising a first portion of a television programming guide for transmission over at least first and second ones of the channels, and encoding information comprising a second portion of the television programming guide, other than the first portion of the television programming guide and other than the programming schedule information, for transmission over at least one channel other than the first and second channels, wherein the encoding data further comprises:

including sequence number information in each data block that is to be transmitted, the sequence number information identifying a relative location of each of the data blocks within the television programming guide; and transmitting the second portion of the television programming guide at a slower rate than the programming schedule information, wherein the second portion of the television programming guide comprises channel logo information.

9. The method of claim 8, wherein the dividing the encoded television programming guide data comprises dividing the encoded data over at least four channels.

10. The method of claim 8, wherein the method is implemented as computer-executable instructions embodied on a computer-readable memory device.

11. A method, comprising:

encoding data for multicast transmission to a plurality of receiver devices;

dividing the encoded data for transmission over multiple channels;

multicasting the encoded data over the multiple channels;

retransmitting the multicasting at predetermined intervals;

receiving a request from at least one receiver device for information associated with the multicast transmission that is needed by the at least one receiver device; and unicasting the information to the at least one receiver device, wherein the encoding data comprises:

encoding programming schedule information for transmission over at least first and second ones of the channels, and encoding information other than programming schedule information for transmission over at least one channel other than the first and second channels, wherein the encoding information other than programming schedule information for transmission over at least one channel other than the first and second channels comprises encoding television station logo information.

12. A method, comprising:

encoding data for multicast transmission to a plurality of receiver devices;

dividing the encoded data for transmission over multiple channels;

multicasting the encoded data over the multiple channels;

retransmitting the multicasting at predetermined intervals;

receiving a request from at least one receiver device for information associated with the multicast transmission that is needed by the at least one receiver device; and unicasting the information to the at least one receiver device, wherein the encoding data comprises:

encoding programming schedule information for transmission over at least two of the channels, and encoding information other than programming schedule information for transmission over at least one channel, and wherein the information other than programming schedule information comprises television station logo information, the method further comprising:

transmitting the television station logo information at a slower rate than the programming schedule information.

13. A system, comprising at least a first device associated with a service provider, the at least a first device comprising:

first logic configured to:

encode program guide data for multicast transmission, and divide the encoded program guide data into data blocks for transmission over a plurality of channels, wherein when encoding, the first logic is further configured to:

include a sequence number in a header of each data block, the sequence number identifying a relative location of each of the data blocks within a programming guide; and a first communication interface configured to:

multicast the encoded data over the plurality of channels, and retransmit the multicasting at predetermined intervals; and a second device associated with a customer, the second device comprising:

a second communication interface configured to:

receive the encoded data multicast over the plurality of channels; and second logic configured to:

decode the encoded data, assemble the programming guide based on the decoded data and the sequence number included in the header of each data block, and output the programming guide to an output device for display, wherein the second logic is further configured to:

transmit a request, via the second communication interface, to the service provider, for at least a portion of the programming guide when the programming guide is not complete, wherein the programming guide includes programming schedule information and channel logo information, and wherein the first communication interface is configured to transmit the channel logo information at a slower rate than the programming schedule information.

14. The system of claim 13, wherein the first logic is configured to transmit, via the first communication interface, the portion of the programming guide to the second device via a unicast transmission.

15. The system of claim 13, wherein the second device comprises at least one of a set top box or a processing device that includes a cable or television card configured to receive television programming.

\* \* \* \* \*